(12) United States Patent
Hasegawa

(10) Patent No.: US 6,580,476 B2
(45) Date of Patent: Jun. 17, 2003

(54) LIQUID CRYSTAL DISPLAY UNIT

(75) Inventor: Kaoru Hasegawa, Ichinomiya (JP)

(73) Assignee: Hitachi, Ltd., Tokyo (JP)

(*) Notice: Subject to any disclaimer, the term of this patent is extended or adjusted under 35 U.S.C. 154(b) by 87 days.

(21) Appl. No.: 09/917,920

(22) Filed: Jul. 31, 2001

(65) Prior Publication Data

US 2002/0021382 A1 Feb. 21, 2002

(30) Foreign Application Priority Data

Aug. 4, 2000 (JP) ........................................ 2000-236305

(51) Int. Cl.[7] .............................................. G02F 1/1333
(52) U.S. Cl. ........................................ 349/58; 361/681
(58) Field of Search ............................ 349/58; 361/681

(56) References Cited

U.S. PATENT DOCUMENTS 6,212,067 B1 * 4/2001 Nakajima et al. ........... 361/681
6,424,391 B1 * 7/2002 Tsukamoto et al. ........... 349/58

* cited by examiner

Primary Examiner—John F. Niebling
Assistant Examiner—Christopher Lattin

(57) ABSTRACT

A liquid crystal display unit in which external vibration or impact is prevented from being applied directly to a housing member through mounting screws for fixing the liquid crystal display unit to an outer casing, so that the display quality of the display image displayed on a liquid crystal display device is improved.

In a liquid crystal display unit having a backlight unit, mounting members having threaded holes into which mounting screws for fixing the liquid crystal display unit to an outer casing are screwed are provided between a side wall of a housing member of the backlight unit and a side wall of a frame member. Each of the mounting members is constituted by a first side and a second side. The first side has threaded holes and extends along the side wall of the housing member. The second side is fixed to the housing member. In each area of the first side in which a threaded hole is provided, the first side has notches on opposite sides of the threaded hole in the extending direction of the housing member.

33 Claims, 9 Drawing Sheets

LIQUID CRYSTAL DISPLAY UNIT

BACKGROUND OF THE INVENTION

1. Field of the Invention

The present invention relates to a liquid crystal display unit for use in a personal computer, a work station, or the like, and particularly relates to a technique which is effectively applicable to narrowing of a frame of a liquid crystal display unit or to thinning of the liquid crystal display unit.

2. Description of the Related Art

STN (Super Twisted Nematic) or TFT (Thin Film Transistor) type liquid crystal display modules are widely used as display units in notebook type personal computers and so on.

Such a liquid crystal display module is constituted by a liquid crystal display panel having a drive circuit portion disposed circumferentially, and a backlight unit for irradiating the liquid crystal display panel.

For example, such a backlight unit is constituted by a liquid guide body, a cold cathode fluorescent tube, a diffusion sheet, a lens sheet (also called a prism sheet), and a reflection sheet, which are received in a mold. The light guide body is provided to guide light emitted from a light source toward a position distanced from the light source so as to uniformly irradiate the whole of the liquid crystal display panel with the light. The cold cathode fluorescent tube is a linear light source disposed in the vicinity of a side surface of the light guide body so as to be parallel with the side surface of the light guide body along the side surface. The diffusion sheet is disposed on the light guide body. The lens sheet is disposed on the diffusion sheet. The reflection sheet is disposed to extend under the light guide body.

Incidentally, such a technique is, for example, disclosed in JP-B-60-19474 and JP-U-4-22780.

FIG. 13 is a schematic view for explaining an example of a mounting method for mounting the above-mentioned liquid crystal display module on a notebook type personal computer.

In FIG. 13, the reference numerals 100 and 101 represent outer and inner casings of a display portion of the notebook type personal computer, respectively. As shown in FIG. 13, a liquid crystal display module 102 is fixed to the outer casing 100 of the display portion of the notebook type personal computer by mounting screws 120 through a side beam 110.

To this end, inserters into which the mounting screws 120 are screwed are embedded in the mold of the liquid crystal display module 102.

Incidentally, although the side beams 110 and the mounting screws 120 are provided on opposite sides of the liquid crystal display module 102, the side beam 110 and the mounting screws 120 on one side are omitted to illustrated in FIG. 13.

FIG. 14 is a main portion sectional view showing the state where the liquid crystal display module shown in FIG. 13 has been mounted on the notebook type personal computer by a conventional mounting method.

Incidentally, FIG. 14 shows a sectional structure cut off in the moving direction of the mounting screws 120 shown in FIG. 13.

As shown in FIG. 14, the conventional liquid crystal display module has inserters 13 at four places (only one of which is shown in FIG. 14) in side surfaces of a mold 14.

Then, each of the mounting screws 120 is screwed into the corresponding inserter 13 through holes formed in the outer casing (for example, plastic casing) 100 of the display portion of the notebook type personal computer, the metal side beam 110, and a frame 4. Thus, the liquid crystal display module is mounted on the notebook type personal computer.

Incidentally, in FIG. 14, SUB1 represents a TFT substrate; SUB2, a color filter substrate; POL1 and POL2, polarizing plates; 4, a frame; 5, a liquid crystal display panel; 6 and 8, diffusion sheets; 7, a lens sheet; 9, a light guide body; and 10, a reflection sheet. These parts will be described later.

As shown in FIG. 14, when the liquid crystal display module is mounted on the notebook type personal computer by use of the inserters 13, external vibration or impact is applied directly to the side walls of the mold 14 through the mounting screws 120 because the inserters 13 are embedded in the side walls of the mold 14.

Thus, as shown in FIG. 15, the mold 14 is bent so that the light guide body 9 and the like are bent consequently. In the worst case, local stress is applied to the liquid crystal display panel 5.

Incidentally, in FIG. 15, the arrows show that the mold 14 is bent so that the light guide body 9 and the like are bent consequently.

Thus, there was a problem that the gap length of the liquid crystal display panel 5 (that is, the distance between the TFT substrate (SUB1) and the color filter substrate (SUB2)) varied so that the display screen of the liquid crystal display panel 5 rippled to spoil the display quality of the liquid crystal display panel 5 significantly.

SUMMARY OF THE INVENTION

The present invention was developed to solve the foregoing problem in the background art. It is an object of the present invention to provide a technique in a liquid crystal display unit in which external vibration or impact is prevented from being applied directly to a housing member through mounting screws for fixing the liquid crystal display unit to an outer casing, so that the display quality of the display screen displayed on a liquid crystal display device can be improved.

It is another object of the present invention to provide a technique in a liquid crystal display unit in which the degree of freedom in the attachment positions of mounting screws for fixing the liquid crystal display unit to an outer casing can be improved.

The aforementioned and other objects and novel features of the present invention will be made clear in the description of this specification and the accompanying drawings.

The summaries of typical aspects of the invention disclosed in this specification will be described briefly as follows.

That is, the present invention is applied to a liquid crystal display unit produced in the following manner. That is, a frame member (frame-like member) is fitted to a housing member (represented by a member known as a mold) for housing constituents (such as a liquid crystal display panel, a light source, optical sheets, etc.) of the liquid crystal display unit so as to form a so-called liquid crystal display module. This liquid crystal display module is fixed to an outer casing. Then, the liquid crystal display unit is completed.

For example, the housing member has a main surface and side surfaces formed around the main surface. Optical parts which are constituents of the liquid crystal display unit are housed on the main surface surrounded by the side surfaces.

In the case of a sidelight liquid crystal display module, a reflector, a light guide plate, optical sheets such as a light diffusion sheet, a prism sheet, and so on, and a liquid crystal display panel are laminated on one another on the main surface in this order.

In the case of a direct backlight liquid crystal display module, a light source unit constituted by a reflector and a plurality of fluorescent tubes fixed to the reflector, a light diffusion plate, optical sheets as described above, and a light crystal display panel are laminated on one another on the main surface in this order.

According to the present invention, in such a liquid crystal display unit, mounting members having threaded holes into which mounting screws for fixing the liquid crystal display unit to an outer casing are screwed are disposed between the side surfaces (side walls) of the housing member and the side walls of the frame member.

Then, each of the mounting members is designed so that the areas in which the threaded holes are provided operate elastically in the moving direction of the mounting screws.

In an embodiment of the present invention, each of the mounting members is constituted by a first side in which the threaded holes are provided and which extends along the side surface of the housing member, and a second side which is fixed to the housing member. The areas of the first side in which the threaded holes are provided operate elastically in the moving direction of the mounting screws.

Further, in a preferred embodiment of the present invention, notches are provided in each area of the first side in which the threaded hole is provided. The notches correspond to two sides of a quadrangle which includes the threaded hole and which surrounds each area of the first side in which the threaded hole is provided.

Further, in a preferred embodiment of the present invention, the first side has notches in each area of the first side in which the threaded hole is provided. The notches are disposed on opposite sides of each threaded hole in the extending direction of the housing-member.

Further, in a preferred embodiment of the present invention, the second side of each of the mounting members is fixed to the housing member by bonding or by mechanical means.

Further, a preferred embodiment of the present invention, the second side of each of the mounting members is fixed to the housing member by in-mold molding.

Further, in a preferred embodiment of the present invention, each of the side surfaces of the housing member has insertion holes to which the forward end portions of the mounting screws are inserted, and the diameter of each insertion hole is made larger than the diameter of the corresponding mounting screw.

Further, in a preferred embodiment of the present invention, each of the side walls of the housing member has groove portions to which the forward end portions of the mounting screws are inserted while a certain gap is maintained between each mounting screw and the wall of the groove portion.

Further, in a preferred embodiment of the present invention, the second sides of the mounting members and the housing member have means respectively for positioning the mounting members.

Further, in a more preferred embodiment of the present invention, the mounting member positioning means of the housing member are protrusion portions, and the mounting member positioning means of the second sides are holes into which the protrusion portions of the housing member are fitted.

Further, in a preferred embodiment of the present invention, the mounting members or the areas of the first sides in which the threaded holes are provided are formed out of an elastic material.

According to the aforementioned means, the mounting members fixed to the housing member are provided, and each of the mounting members has areas in each of which the threaded hole is provided and which are designed to operate elastically in the moving direction of the mounting screws. It is therefore possible to prevent external vibration and impact from being applied directly to the housing member through the mounting screws for fixing the liquid crystal display unit to an outer casing.

Thus, it is possible to improve the display quality of the display screen displayed on the liquid crystal display device.

In addition, according to the aforementioned means, the threaded holes provided in the mounting members can be provided in desirable positions in the thickness direction of the liquid crystal display unit. Thus, it is possible to improve the degree of freedom in the positions where the mounting screws are attached.

DETAILED DESCRIPTION OF THE PREFERRED EMBODIMENTS

Embodiments of the present invention will be described below in detail with reference to the drawings.

Incidentally, parts having the same functions are referenced correspondingly in all of the drawings for explaining the embodiments, and they will not be described repeatedly.

Figure 1:
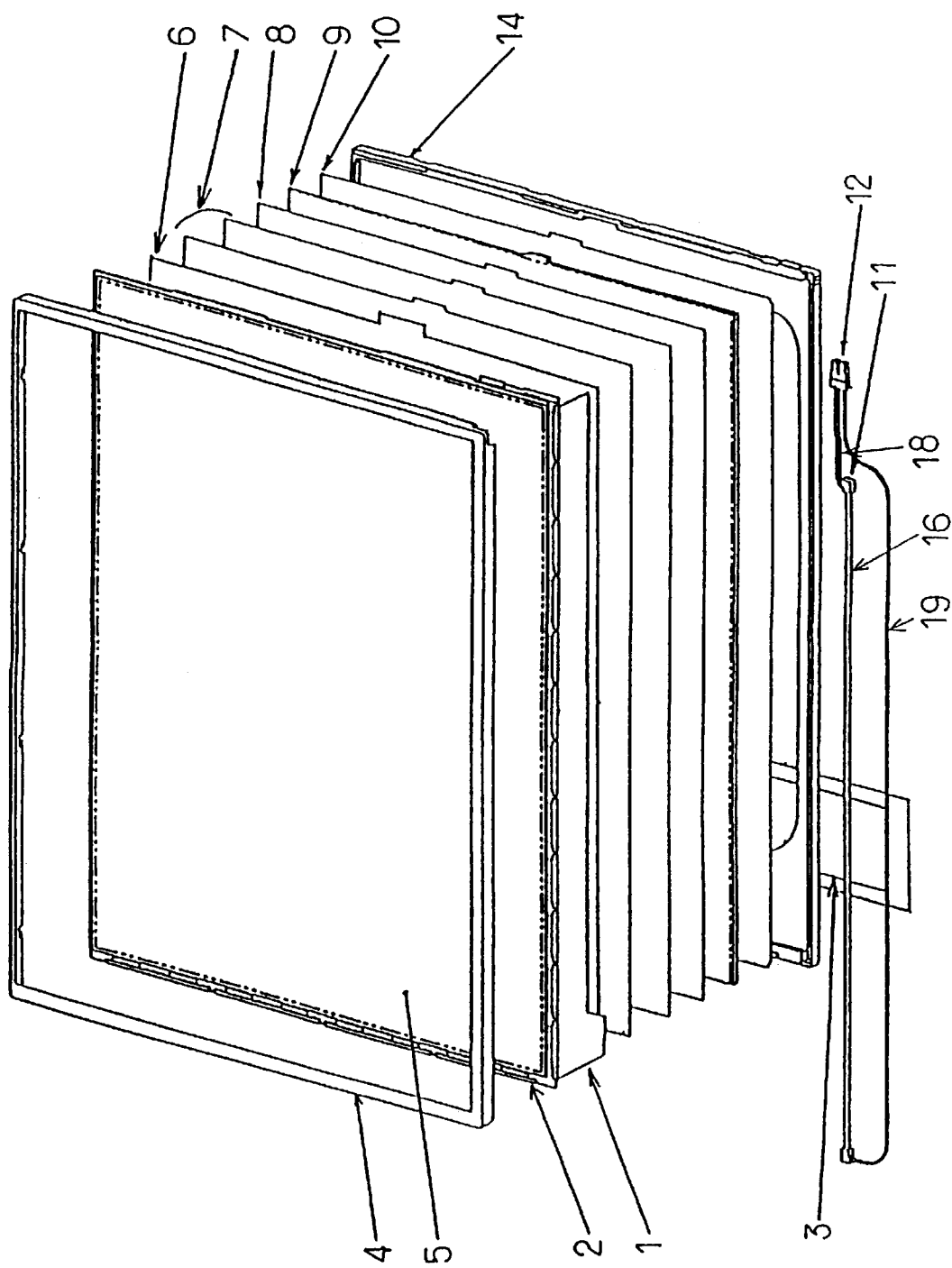
FIG. 1 is an exploded perspective view showing the schematic configuration of a TFT type liquid crystal display module (LCM) to which the present invention is applied.

Basic Configuration of a TFT Type Liquid Crystal Display Module to which the Present Invention is Applied FIG. 1 is an exploded perspective view showing the schematic configuration of a TFT type liquid crystal display module (LCM) to which the present invention is applied.

The liquid crystal display module (LCM) shown in FIG. 1 is constituted by a frame 4 made of a metal plate, a liquid crystal display panel (LCD; liquid crystal display device according to the present invention) 5, and a backlight unit.

The liquid crystal display panel 5 is formed as follows. That is, a TFT substrate in which pixel electrodes, thin film transistors, and so on, are formed, and a filter substrate in which opposed electrodes, color filters, and so on, are formed, are subjected to panel alignment with each other at a predetermined gap. The substrates are laminated on each other through a sealing material provided like a frame in the vicinity of a circumferential edge portion between the substrates. In addition, liquid crystal is injected into a portion defined by the sealing material between the substrates, from a liquid crystal injection port provided as a part of the sealing material. Thus, the liquid crystal is sealed with the sealing material. Further, polarizing plates are laminated to the outsides of the substrates respectively.

Here, a plurality of drain drivers and a plurality gate drivers constituted by semiconductor integrated circuit devices (ICS) are mounted on the glass substrate of the TFT substrate.

To each of the drain drivers, a driving power source, display data, and a control signal are supplied through a flexible printed wiring board 1. On the other hand, to each of the gate drivers, a driving power source and a control signal are supplied through a flexible printed wiring board 2.

These flexible printed wiring boards 1 and 2 are connected to a drive circuit board 3 provided behind the backlight unit.

In addition, the liquid crystal display panel 5 on which the plurality of drain drivers and the plurality of gate drivers are mounted is designed to be received between the frame 4 having a display window and the backlight unit.

Then, the area of the display window of the frame 4 forms a display area of the liquid crystal display module (LCM). The area other than this display area, that is, the area of the frame 4 surrounding the display window is usually called a frame.

The backlight unit of the liquid crystal display module in this embodiment is formed as follows. That is, a cold cathode fluorescent tube 16, a light guide body 9 which is shaped like a wedge (the side surface is shaped like a trapezoid), diffusion sheets 6 and 8, lens sheets 7 and a reflection sheet 10 are fitted to a mold 14 in the order shown in FIG. 1. The mold 14 is formed like a frame with side walls.

Incidentally, in FIG. 1, the reference numeral 11 represents a rubber bush; 12, a connector; and 18 and 19, cables.

Configuration of the Backlight Unit of the Liquid Crystal Display Module Shown in FIG. 1

Figure 2:
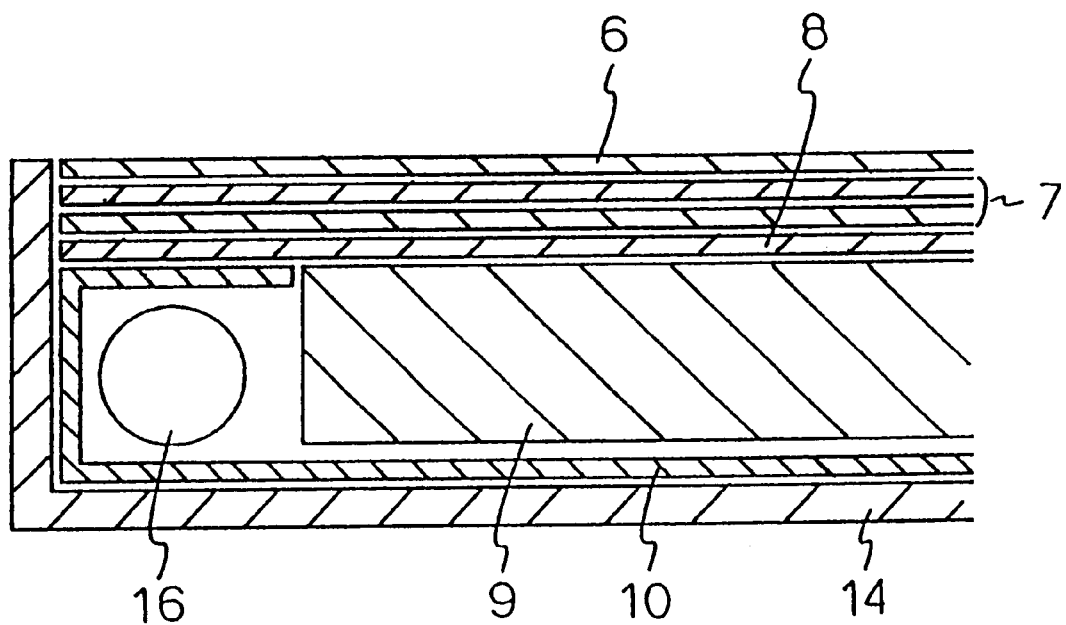
FIG. 2 is a sectional view showing a main portion sectional structure of a backlight unit of the liquid crystal display module shown in FIG. 1.

FIG. 2 is a sectional view showing a main portion sectional structure of the backlight unit of the liquid crystal display module shown in FIG. 1.

Incidentally, FIG. 2 shows the sectional structure of the backlight unit cut off at a plane perpendicular to the cold cathode fluorescent tube 16.

As shown in FIG. 2, the cold cathode fluorescent tube 16 is disposed near and along a side surface of the light guide body 9 so as to be parallel with the side surface of the light guide body 9.

The light guide body 9 guides light emitted from the cold cathode fluorescent tube 16 toward a position distanced from the cold cathode fluorescent tube 16 so that the liquid crystal display panel as a whole is irradiated with the light uniformly.

Here, the light guide body 9 is formed into a wedge-like shape in which the surface facing the cold cathode fluorescent tube 16 is wide while the sectional area becomes smaller as the distance from the cold cathode fluorescent tube 16 increases.

Diffusion sheets 6 and 8 and a pair of lens sheets 7 are disposed on the light guide body. The reflection sheet 10 has a sectional shape which has a substantially U-shape in the portion surrounding the cold cathode fluorescent tube 16. The inner surface of the reflection sheet 10 is white or silver. The reflection sheet 10 is disposed to cover substantially all over the length of the cold cathode fluorescent tube 16 and to extend under the light guide body 9.

Thus, light radiated in a direction different from the light guide body 9 can be condensed into the light guide body 9 unwastefully.

Figure 3:
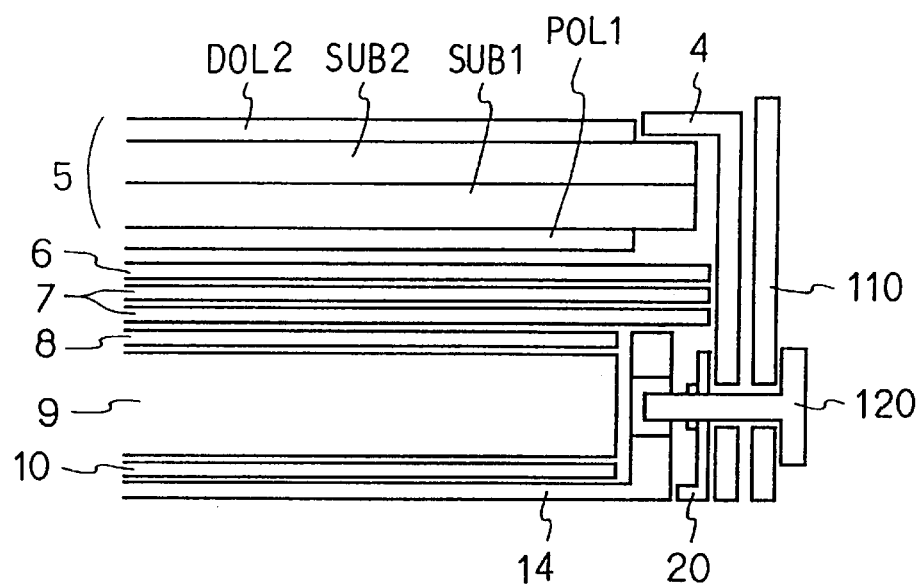
FIG. 3 is a main portion sectional view for explaining a mounting method in which a liquid crystal display module according to an embodiment of the present invention is mounted on a notebook type personal computer.

Features of the TFT Type Liquid Crystal Display Module According to Embodiment 1 of the Present Invention FIG. 3 is a main portion sectional view for explaining a mounting method in which a liquid crystal display module according to this embodiment is mounted on a notebook type personal computer.

Incidentally, this embodiment will be described on the basis of the liquid crystal display module described above with reference to FIGS. 1 and 2.

Although mounting screws 120 are provided at four places in this embodiment, only one of them is shown in FIG. 3.

As shown in FIG. 3, in this embodiment, a mounting member 20 is provided between a side wall of a frame 4 and a side wall of a mold 14.

Figure 4:
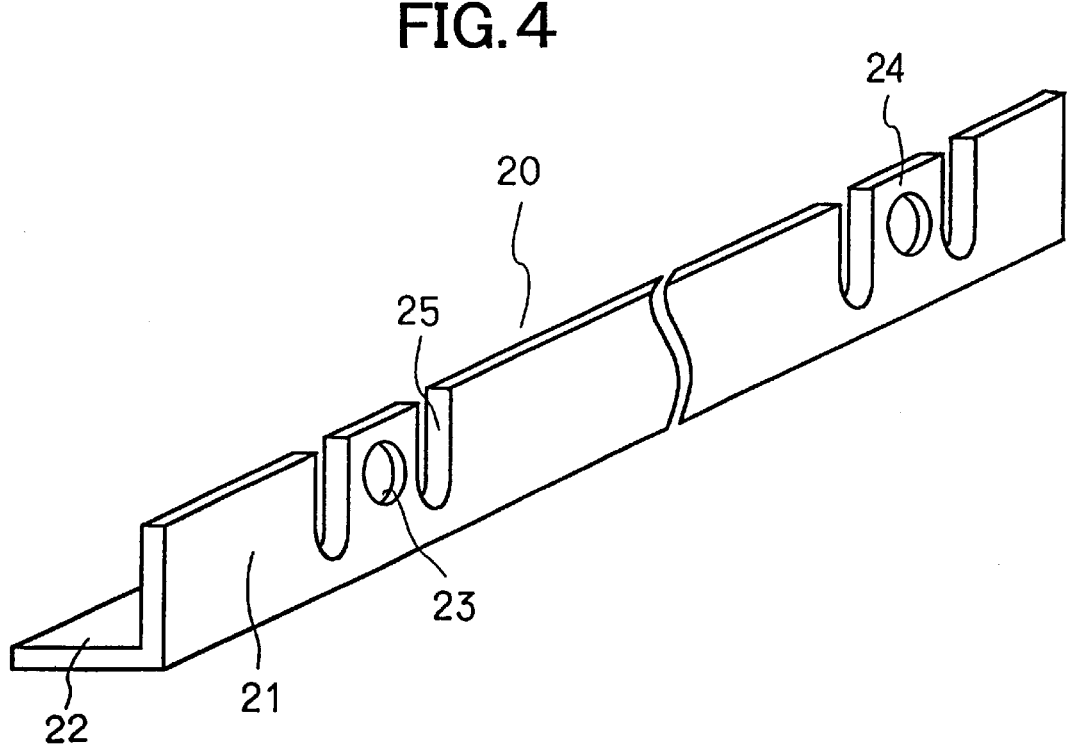
FIG. 4 is a perspective view showing the schematic configuration of an example of a mounting member shown in FIG. 3.

FIG. 4 is a perspective view showing the schematic configuration of an example of the mounting member 20 shown in FIG. 3.

As shown in FIG. 4, the mounting member 20 is constituted by a first side 21 and a second side 22 so that the sectional shape of the mounting member 20 cut off in the thickness direction of the module is formed into an L-shape.

The first side 21 is extended along the side wall of the frame 4. Threaded holes 23 into which mounting screws 120 are screwed are provided in the first side 21.

In addition, notches 25 are provided on opposite sides of each of the threaded holes 23 in the first side 21. Areas 24 separated by the notches 25 and including the threaded holes 23 can move in the moving directions of the mounting screws 120, respectively, independently of the first side 21.

In addition, the second side 22 is fixed to the module 14, and the mounting member 20 is fixed to the module 14.

Figure 5:
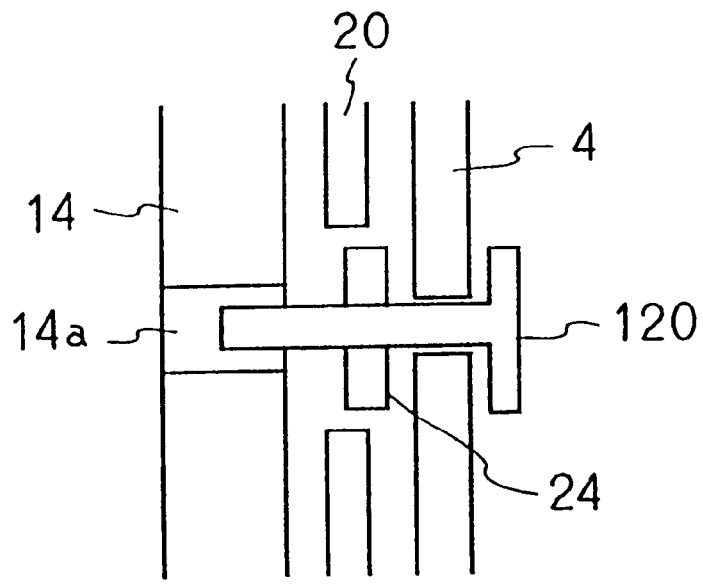
FIG. 5 is a diagram for explaining the reason why a mold is not deformed even if external vibration or impact is applied to a mounting screw in the liquid crystal display module according to the embodiment of the present invention.

In this embodiment, for example, even if external vibration or impact is applied to the mounting screw 120, only the area 24 including the threaded-hole 23 is elastically deformed by the vibration or impact so as to relieve the external vibration or impact, as shown in FIG. 5. Thus, it is possible to prevent the external vibration or impact from being applied to the mold 14.

Further, a hole 14a into which the forward end portion of the mounting screw 120 is inserted is provided in the mold 14. The diameter of this hole 14a is made larger than the diameter of the forward end portion of the mounting screw 120. Thus, even if oblique vibration or impact is applied to the mounting screw 120 so that the mounting screw 120 is tilted obliquely, it is possible to prevent the mounting screw 120 from abutting against the mold 14 so that the mold 14 is prevented from being deformed.

Incidentally, FIG. 5 is a diagram in which the frame 4, the mold 14 and the mounting member 20 involved in the mounting structure are shown in close-up respectively when such a liquid crystal display module as shown in FIG. 1 is mounted on an outer casing through the mounting screws 120. Parts and members (the outer casing 100 and respective members constituting the backlight unit) other than those members mentioned above are not shown.

Figure 6:
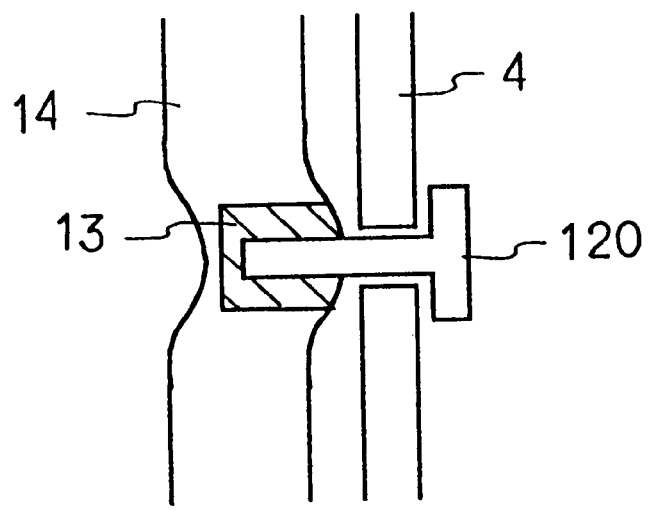
FIG. 6 is a diagram for explaining that a mold is deformed when external vibration or impact is applied to a mounting screw in a conventional liquid crystal display module.
Figure 14:
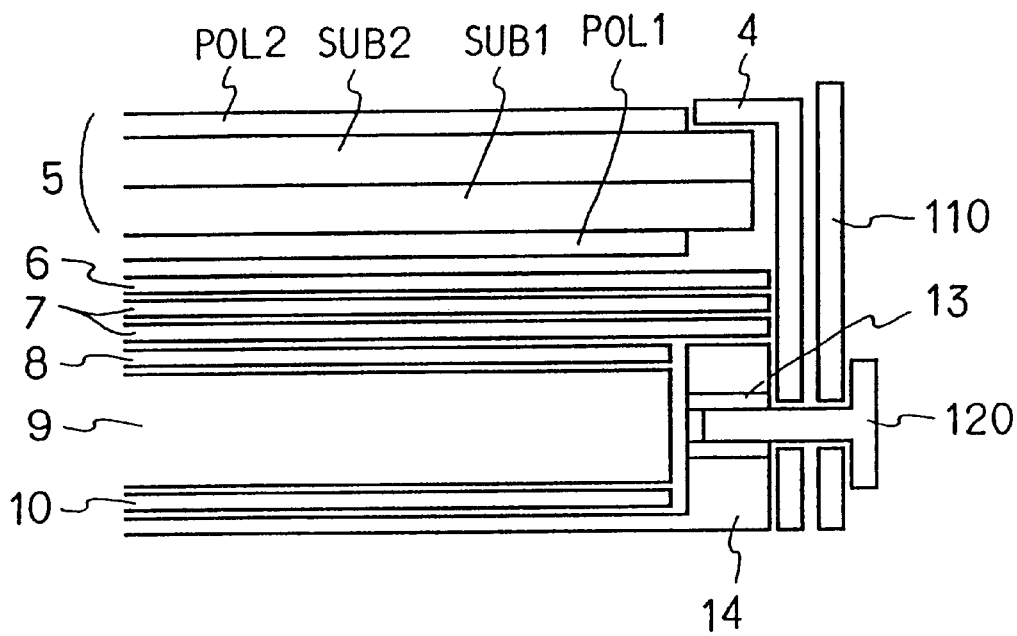
FIG. 14 is a main portion sectional view showing the state where the liquid crystal display module shown in FIG. 13 has been mounted on the notebook type personal computer according to a conventional mounting method.
Figure 15:
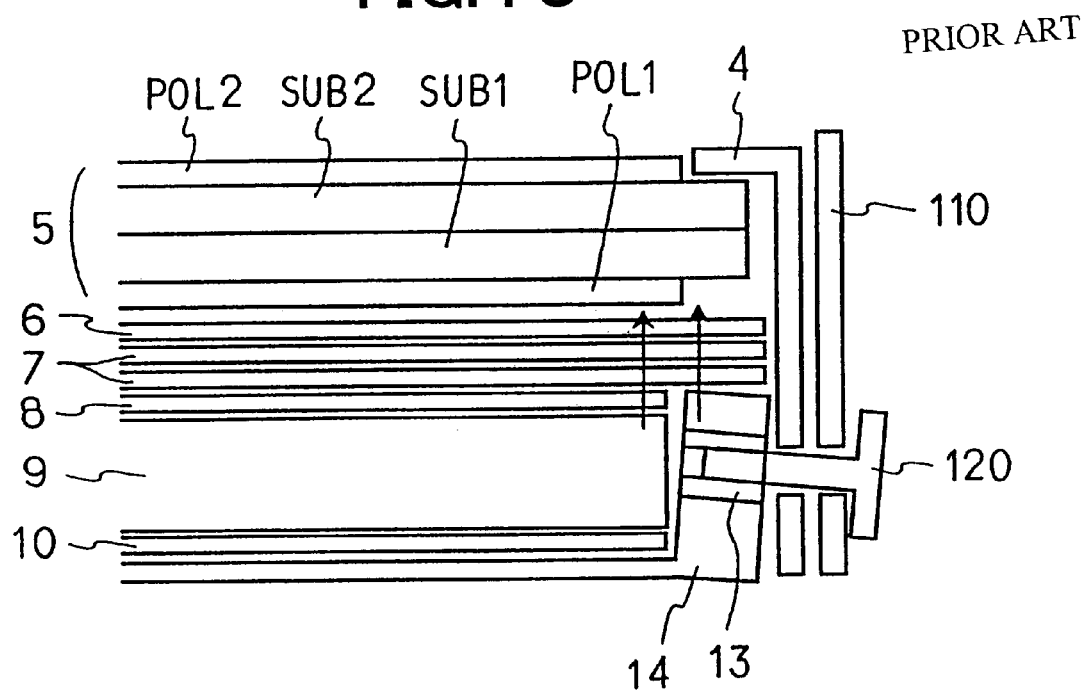
FIG. 15 is a diagram for explaining that external vibration or impact is applied directly to a side wall of a mold in the state where the liquid crystal display module shown in FIG. 13 has been mounted on the notebook type personal computer according to the conventional mounting method.

On the contrary, in the liquid crystal display unit shown in FIG. 14, if external vibration or impact is applied to the mounting screw 120, the external vibration or impact is applied directly to the mold 14 because the mounting screw 120 is screwed into the inserter 13 as shown in FIG. 6. Thus, the mold 14 is deformed.

Figure 13:
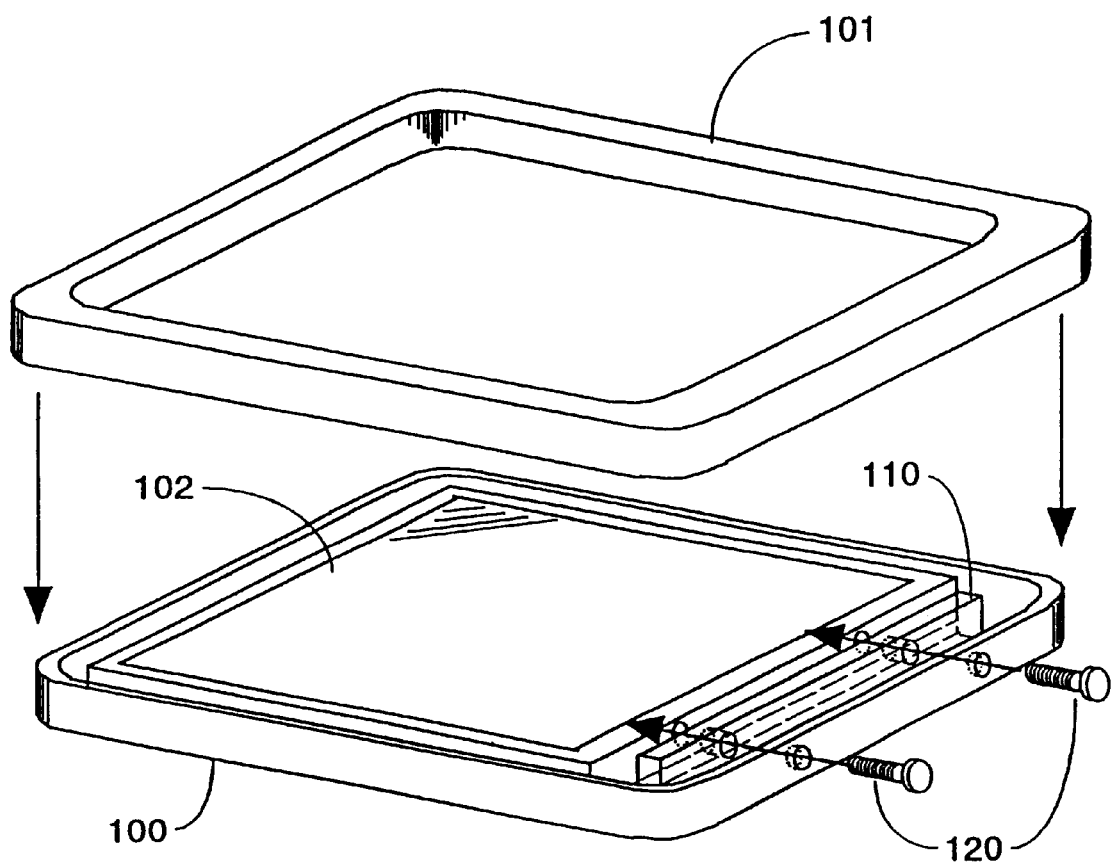
FIG. 13 is a schematic view for explaining an example of a mounting method in which a liquid crystal display module is mounted on a notebook type personal computer.

Particularly, if the side beam 110 shown in FIG. 13 is formed out of a high-rigidity material such as a magnesium alloy or the like, external vibration or impact is applied directly to the mounting screw 120. Thus, the mold 14 is deformed easily.

Incidentally, FIG. 6 is also a diagram in which the frame 4 and the mold 14 involved in the mounting structure are shown in close-up respectively when the conventional liquid crystal display module is mounted on an outer casing through the mounting screws 120. Parts and members (the outer casing 100 and respective members constituting the backlight unit) other than those members mentioned above are not shown.

Thus, in this embodiment, the area 24 including the threaded hole 23 is designed to operate elastically in the moving direction of the mounting screw 120. Accordingly, even if external vibration or impact is applied through the mounting screw 120, only the area 24 is elastically deformed to relieve the external vibration or impact. Thus, it is possible to prevent the mold 14 from being deformed. As a result, it is possible to improve the display quality of the display image displayed on the liquid crystal display panel 5.

Figure 7:
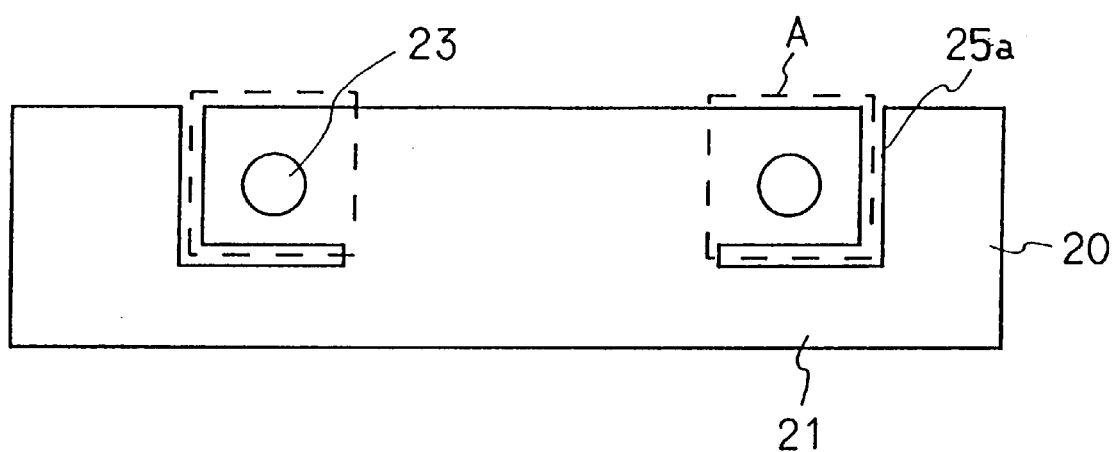
FIG. 7 is a diagram showing the configuration of another example of the mounting member shown in FIG. 3.

Incidentally, in this embodiment, instead of the notches 25 provided on the opposite sides of each of the threaded holes 23, an L-shaped notch 25a may be provided around each of the threaded holes 23 as shown in FIG. 7.

That is, in this embodiment, the notches 25 (25a) are made to correspond to two sides of a quadrangle which surrounds the area 24 including the threaded hole 23 (quadrangle A shown by a broken-line frame in FIG. 7). Thus, only the area 24 including the threaded hole 23 is elastically deformed so that external vibration or impact can be relieved.

However, the mounting member 20 shown in FIG. 3 can be manufactured more easily than the mounting member 20 shown in FIG. 7.

Alternatively, instead of the notches 25 provided on the opposite sides of each of the threaded holes 23, a plurality of bent portions formed repeatedly may be provided so that only the area 24 including the threaded screw 23 is elastically deformed to relieve external vibration or impact.

In this embodiment, the threaded holes 23 provided in the first side 21 may be formed in desirable positions in the thickness direction (hereinafter, referred to as "Z-direction" simply) of the liquid crystal display module.

For example, the threaded holes 23 can be formed to be 4.1 mm deep from the surface of the liquid crystal display module.

On the contrary, in the liquid crystal display unit shown in FIG. 14, such threaded holes cannot be disposed in the liquid crystal display panel 5 side of the mold 14, because the liquid crystal display panel 5 is disposed on the side wall of the mold 14 so as to make a hindrance to formation of the threaded holes.

That is, in the conventional liquid crystal display unit, the threaded holes 23 can be formed to be at most as deep as about 4.5 mm from the surface of the liquid crystal display module.

Figure 8:
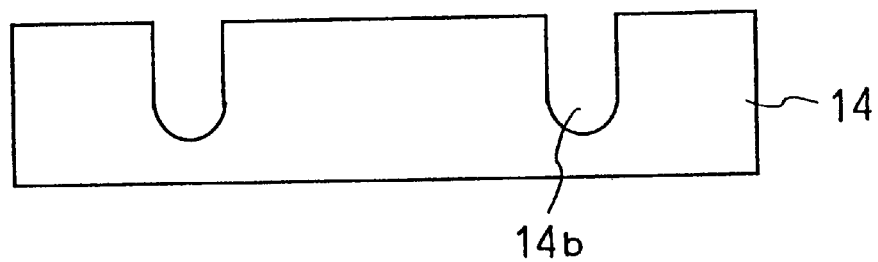
FIG. 8 is a diagram showing another example of the mold according to the embodiment of the present invention.

Incidentally, in this embodiment, instead of the holes 14a provided in the mold 14, Z-direction grooves 14b may be provided in the mold 14 as shown in FIG. 8.

According to such a structure, even if the threaded holes 23 provided in the first side 21 are formed in any positions in the Z-direction, the problem of the positions of the threaded holes 23 can be coped with by only one mold 14.

The mounting member 20 in this embodiment is formed out of an elastic (springy) metal material such as phosphor bronze or the like, or only the areas 24 including the threaded holes 23 are formed out of such an elastic metal material.

Then, the second side 22 of the mounting member 20 is fixed to the mold 14 by bonding, or by mechanical means such as screwing or the like so that the mounting member 20 is fixed to the mold 14.

Figure 9:
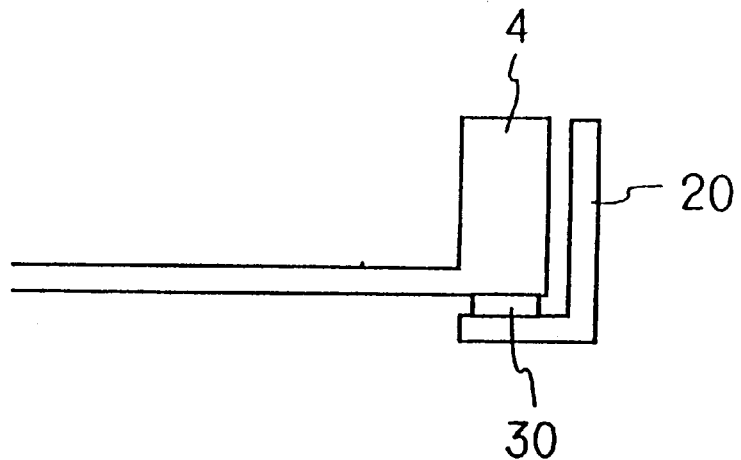
FIG. 9 is a diagram for explaining an example of a fixing method for fixing the mounting member shown in FIG. 3 to the mold.

For example, as shown in FIG. 9, the second side 22 is fixed to the mold 14 by a double-sided adhesive tape 30 or the like so that the mounting member 20 is fixed to the mold 14.

Figure 10:
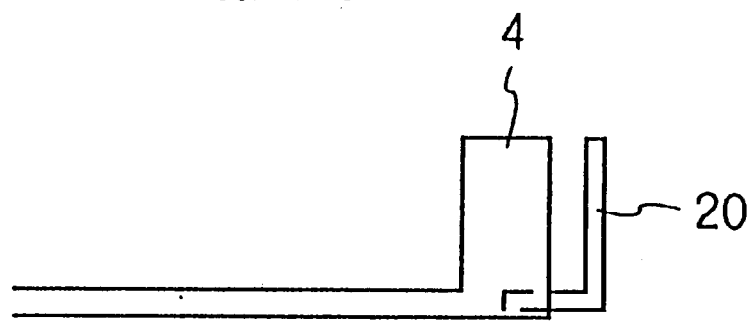
FIG. 10 is a diagram for explaining another example of a fixing method for fixing the mounting member shown in FIG. 3 to the mold.

Alternatively, as shown in FIG. 10, the second side 22 may be fixed to the mold 14 by in-mold molding so that the mounting member 20 is fixed to the mold 14.

Figure 11:
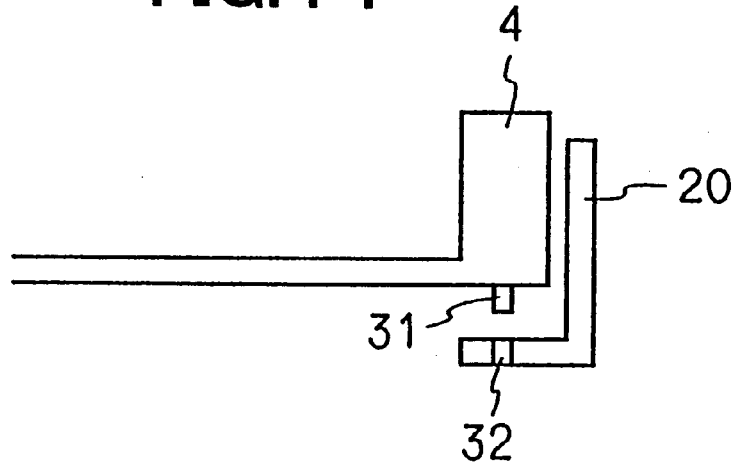
FIG. 11 is a diagram for explaining a further example of a fixing method for fixing the mounting member shown in FIG. 3 to the mold.

In this case, if a positioning protrusion 31 is provided in the mold 14 and a hole 32 to which the protrusion 31 is inserted is provided in the second side of the mounting member 20 as shown in FIG. 11, it becomes easy to position the mounting member 20 when the mounting member 20 is mounted on the mold 14.

Incidentally, FIGS. 9 to 11 are diagrams in which the mold 14 and the mounting member 20 are shown in close-up respectively. Parts and members (the frame 4 and respective members constituting the backlight unit) other than those members mentioned above are not shown.

Figure 12:
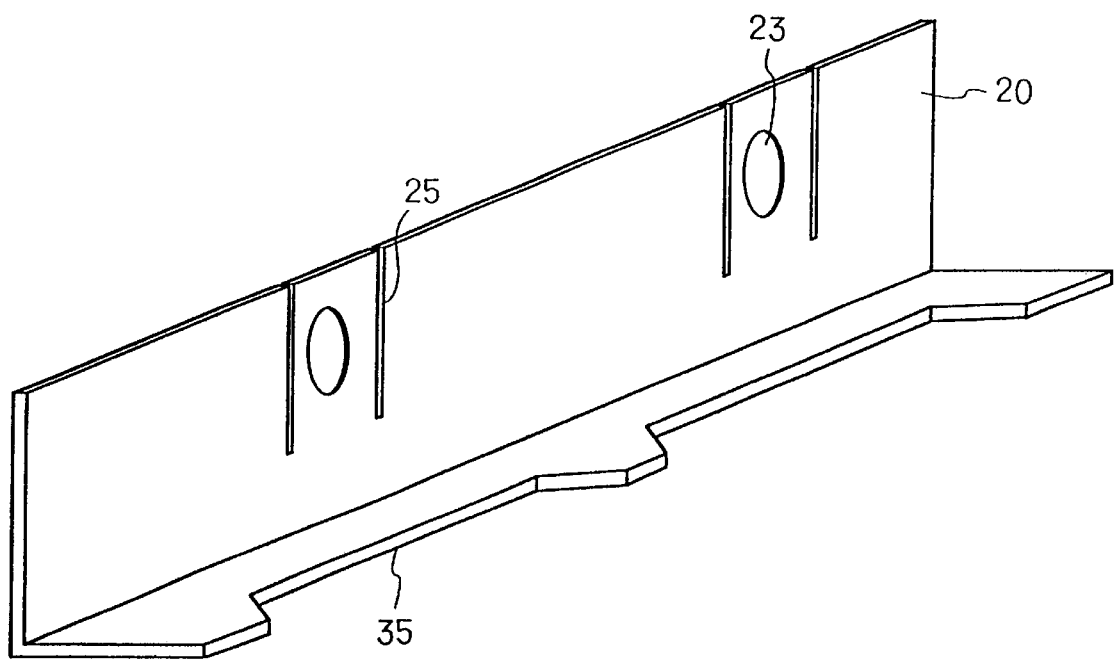
FIG. 12 is a diagram showing the configuration of a further example of the mounting member shown in FIG. 3.

In addition, as shown in FIG. 12, recess portions 35 may be provided in the second side except the portions where the second side is fixed to the mold 14.

Incidentally, in the above-mentioned respective embodiments, description was made mainly about the embodiments in which the present invention was applied to a TFT type liquid crystal display module. However, the present invention is not limited to the embodiments. Not to say, the present invention is applicable also to an STN type liquid crystal display module.

The invention developed by the present inventor was described above specifically on the basis of the embodiments. However, the present invention is not limited to the embodiments Not to say, various modifications can be made without departing the spirit and the scope of the present invention.

Effects obtained by typical aspects of the invention disclosed in this specification will be described briefly as follows.

(1) According to a liquid crystal display unit of the present invention, it is possible to prevent external vibration or impact from being applied directly to a housing member through mounting screws for fixing the liquid crystal display unit to an outer casing.

Thus, it is possible to improve the display quality of the display screen.

(2) According to the liquid crystal display unit of the present invention, it is possible to enhance the degree of freedom in the attachment positions of the mounting screws for fixing the liquid crystal display unit to the outer casing.

What is claimed is:

1. A liquid crystal display unit comprising:

a liquid crystal display device;

a frame member which is disposed on a display surface side of said liquid crystal display device, and which has a display window and a side wall around said display window;

a housing member for housing a light source at least for irradiating said liquid crystal display device with irradiation light, said housing member being disposed on a surface opposite to said display surface of said liquid crystal display device, and having a side wall around said liquid crystal display device; and mounting members which are disposed between said side wall of said frame member and said side wall of said housing member, and which have threaded holes into which mounting screws for fixing said liquid crystal display unit to an outer casing are screwed;

wherein each of said mounting member is fixed to said housing member, while an area of said mounting member in which each of said threaded holes is provided is designed to operate elastically in a moving direction of said mounting screw.

2. A liquid crystal display unit according to claim 1, wherein:

said side wall of said housing member has insertion holes to which forward end portions of said mounting screws are inserted; and a diameter of each of said insertion holes is larger than a diameter of corresponding one of said mounting screws.

3. A liquid crystal display unit according to claim 1, wherein said side wall of said housing member has groove portions to which forward end portions of said mounting screws are inserted while a certain gap is maintained between each mounting screw and a wall of corresponding one of said groove portions.

4. A liquid crystal display unit according to claim 1, wherein said mounting members are fixed to said housing member by bonding or by mechanical means.

5. A liquid crystal display unit according to claim 1, wherein said mounting members are fixed to said housing member by in-mold molding.

6. A liquid crystal display unit according to claim 1, wherein said mounting members and said housing member have means respectively for positioning said mounting members.

7. A liquid crystal display unit according to claim 6, wherein:

said mounting member positioning means of said housing member are protrusion portions; and said mounting member positioning means of said mounting members are holes into which said protrusion portions of said housing member are fitted.

8. A liquid crystal display unit comprising:

a liquid crystal display device;

a frame member which is disposed on a display surface side of said liquid crystal display device, and which has a display window and a side wall around said display window;

a housing member for housing a light source at least for irradiating said liquid crystal display device with irradiation light, said housing member being disposed on a surface opposite to said display surface of said liquid crystal display device, and having a side wall around said liquid crystal display device; and mounting members which are disposed between said side wall of said frame member and said side wall of said housing member, and which have threaded holes into which mounting screws for fixing said liquid crystal display unit to an outer casing are screwed;

wherein each of said mounting members is constituted by a first side in which said threaded holes are provided and which extends along said side wall of said housing member, and a second side which is fixed to said housing member; and wherein an area of said first side in which each of said threaded holes is provided is designed to operate elastically in a moving direction of said mounting screw.

9. A liquid crystal display unit comprising:

a liquid crystal display device;

a frame member which is disposed on a display surface side of said liquid crystal display device, and which has a display window and a side wall around said display window;

a housing member for housing a light source at least for irradiating said liquid crystal display device with irradiation light, said housing member being disposed on a surface opposite to said display surface of said liquid crystal display device, and having a side wall around said liquid crystal display device; and mounting members which are disposed between said side wall of said frame member and said side wall of said housing member, and which have threaded holes into which mounting screws for fixing said liquid crystal display unit to an outer casing are screwed;

wherein each of said mounting members is constituted by a first side in which said threaded holes are provided and which extends along said side wall of said housing member, and a second side which is fixed to said side wall of said housing member; and wherein notches are provided in an area of said first side where each of said threaded holes is provided, said notches corresponding to two sides of a quadrangle, said quadrangle including said threaded hole and surrounding said area of said first side in which said threaded hole is provided.

10. A liquid crystal display unit comprising:

a liquid crystal display device;

a frame member which is disposed on a display surface side of said liquid crystal display device, and which has a display window and a side wall around said display window;

a housing member for housing a light source at least for irradiating said liquid crystal display device with irradiation light, said housing member being disposed on a surface opposite to said display surface of said liquid crystal display device, and having a side wall around said liquid crystal display device; and mounting members which are disposed between said side wall of said frame member and said side wall of said housing member, and which have threaded holes into which mounting screws for fixing said liquid crystal display unit to an outer casing are screwed;

wherein each of said mounting members is constituted by a first side in which said threaded holes are provided and which extends along said side wall of said housing member, and a second side which is fixed to said side wall of said housing member; and wherein said first side has notches in an area of said first side in which each of said threaded holes is provided, said notches being disposed on opposite sides of said threaded hole in an extending direction of said housing member.

11. A liquid crystal display unit according to claim 8, wherein:

said side wall of said housing member has insertion holes to which forward end portions of said mounting screws are inserted; and a diameter of each of said insertion holes is larger than a diameter of corresponding one of said mounting screws.

12. A liquid crystal display unit according to claim 8, wherein said side wall of said housing member has groove portions to which forward end portions of said mounting screws are inserted while a certain gap is maintained between each mounting screw and a wall of corresponding one of said groove portions.

13. A liquid crystal display unit according to claim 8, wherein each of said second sides is fixed to said housing member by bonding or by mechanical means.

14. A liquid crystal display unit according to claim 8, wherein each of said second sides is fixed to said housing member by in-mold molding.

15. A liquid crystal display unit according to claim 8, wherein said second sides and said housing member have means respectively for positioning said mounting members.

16. A liquid crystal display unit according to claim 15, wherein:

said mounting member positioning means of said housing member are protrusion portions; and said mounting member positioning means of said second sides are holes into which said protrusion portions of said housing member are fitted.

17. A liquid crystal display unit according to claim 1, wherein said mounting members are formed out of an elastic material.

18. A liquid crystal display unit according to claim 8, wherein said area of said first side in which each of said threaded holes is provided is formed out of a springy material.

19. A liquid crystal display unit according to claim 9, wherein:

said side wall of said housing member has insertion holes to which forward end portions of said mounting screws are inserted; and a diameter of each of said insertion holes is larger than a diameter of corresponding one of said mounting screws.

20. A liquid crystal display unit according to claim 10, wherein:

said side wall of said housing member has insertion holes to which forward end portions of said mounting screws are inserted; and a diameter of each of said insertion holes is larger than a diameter of corresponding one of said mounting screws.

21. A liquid crystal display unit according to claim 9, wherein said side wall of said housing member has groove portions to which forward end portions of said mounting screws are inserted while a certain gap is maintained between each mounting screw and a wall of corresponding one of said groove portions.

22. A liquid crystal display unit according to claim 10, wherein said side wall of said housing member has groove portions to which forward end portions of said mounting screws are inserted while a certain gap is maintained between each mounting screw and a wall of corresponding one of said groove portions.

23. A liquid crystal display unit according to claim 9, wherein each of said second sides is fixed to said housing member by bonding or by mechanical means.

24. A liquid crystal display unit according to claim 10, wherein each of said second sides is fixed to said housing member by bonding or by mechanical means.

25. A liquid crystal display unit according to claim 9, wherein each of said second sides is fixed to said housing member by in-mold molding.

26. A liquid crystal display unit according to claim 10, wherein each of said second sides is fixed to said housing member by in-mold molding.

27. A liquid crystal display unit according to claim 9, wherein said second sides and said housing member have means respectively for positioning said mounting members.

28. A liquid crystal display unit according to claim 10, wherein said second sides and said housing member have means respectively for positioning said mounting members.

29. A liquid crystal display unit according to claim 8, wherein said mounting members are formed out of an elastic material.

30. A liquid crystal display unit according to claim 9, wherein said mounting members are formed out of an elastic material.

31. A liquid crystal display unit according to claim 10, wherein said mounting members are formed out of an elastic material.

32. A liquid crystal display unit according to claim 9, wherein said area of said first side in which each of said threaded holes is provided is formed out of a springy material.

33. A liquid crystal display unit according to claim 10, wherein said area of said first side in which each of said threaded holes is provided is formed out of a springy material.

* * * * *